United States Patent
Wang et al.

(10) Patent No.: US 11,596,035 B2
(45) Date of Patent: Feb. 28, 2023

(54) DIMMING CONTROL CIRCUIT, DIMMING CONTROL METHOD AND LED DRIVER THEREOF

(71) Applicant: Silergy Semiconductor Technology (Hangzhou) LTD, Hangzhou (CN)

(72) Inventors: Longqi Wang, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 38 days.

(21) Appl. No.: 16/538,970

(22) Filed: Aug. 13, 2019

(65) Prior Publication Data
US 2020/0060003 A1  Feb. 20, 2020

(30) Foreign Application Priority Data
Aug. 20, 2018 (CN) .......................... 201810948699.2

(51) Int. Cl.
| H05B 45/10 | (2020.01) |
| H05B 45/37 | (2020.01) |
| H05B 47/16 | (2020.01) |
| H02M 3/335 | (2006.01) |

(52) U.S. Cl.
CPC ........ *H05B 45/10* (2020.01); *H02M 3/33507* (2013.01); *H05B 45/37* (2020.01); *H05B 47/16* (2020.01)

(58) Field of Classification Search
CPC ........ H05B 45/10; H05B 47/16; H05B 45/37; H05B 45/385; H05B 45/00; H02M 3/33507; H02M 2001/007; H02M 7/06

USPC .......................................................... 315/200
See application file for complete search history.

(56) References Cited

U.S. PATENT DOCUMENTS

| 6,075,716 | A | 6/2000 | He et al. |
| 6,385,057 | B1 | 5/2002 | Barron |
| 8,471,488 | B1 | 6/2013 | Hopkins et al. |
| 8,629,619 | B2* | 1/2014 | Clauberg ............... H05B 45/10 |
| | | | 315/125 |
| 9,077,260 | B2 | 7/2015 | Zhao et al. |
| 9,124,169 | B2 | 9/2015 | Garlow et al. |
| 9,525,336 | B2 | 12/2016 | Huang |
| 9,839,080 | B2* | 12/2017 | Zhou ...................... H05B 45/10 |
| 2009/0243398 | A1 | 10/2009 | Yohanan et al. |

(Continued)

FOREIGN PATENT DOCUMENTS

| CN | 108093534 A | | 5/2008 |
| CN | 108093534 A | * | 5/2018 |

*Primary Examiner* — Jany Richardson

(57) ABSTRACT

A dimming control circuit for an LED driver, can include: an adjusting circuit configured to generate an adjusting signal in accordance with a PWM dimming signal; and where a switching state of a power transistor of the LED driver is adjusted in accordance with the adjusting signal and a constant current control signal. A dimming control method for an LED driver, can include: determining a first threshold in accordance with a frequency of the PWM dimming signal and a frequency range of audio noise; generating an adjusting signal having a first duty cycle when a duty cycle of a PWM dimming signal is not greater than the first threshold; and controlling, by the adjusting signal, a switching state of a power transistor in the LED driver, where the first duty cycle is greater than the duty cycle of the PWM dimming signal.

15 Claims, 6 Drawing Sheets

(56) References Cited

U.S. PATENT DOCUMENTS

| | | | | |
|---|---|---|---|---|
| 2012/0176048 A1* | 7/2012 | Li | .......................... | H05B 45/46 |
| | | | | 315/186 |
| 2012/0217889 A1* | 8/2012 | Jayabalan | ............... | H05B 45/14 |
| | | | | 315/209 R |
| 2013/0321484 A1* | 12/2013 | Kim | ..................... | H05B 45/325 |
| | | | | 345/690 |
| 2013/0336020 A1* | 12/2013 | Balakrishnan | ........ | H02M 3/335 |
| | | | | 363/21.13 |
| 2014/0218657 A1* | 8/2014 | Haruta | ................. | G09G 3/3426 |
| | | | | 349/61 |
| 2015/0207398 A1 | 7/2015 | Proca | | |
| 2015/0216007 A1 | 7/2015 | Ferrara et al. | | |
| 2016/0172981 A1* | 6/2016 | Gritti | ..................... | H05B 45/37 |
| | | | | 363/21.12 |
| 2016/0255693 A1* | 9/2016 | Wang | ..................... | H05B 45/44 |
| | | | | 315/185 R |
| 2019/0394845 A1* | 12/2019 | Chen | ..................... | H05B 45/14 |
| 2020/0107425 A1* | 4/2020 | Zijlman | ............. | H05B 45/3725 |

* cited by examiner

DIMMING CONTROL CIRCUIT, DIMMING CONTROL METHOD AND LED DRIVER THEREOF

RELATED APPLICATIONS

This application claims the benefit of Chinese Patent Application No. 201810948699.2, filed on Aug. 20, 2018, which is incorporated herein by reference in its entirety.

FIELD OF THE INVENTION

The present invention generally relates to the field of power electronics, and more particularly to dimming control circuits and methods, and associated LED drivers.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In light-emitting diodes (LED) dimming applications, the conversion efficiency of a power converter in an LED driver is typically very low when a load is light. Therefore, in order to improve the conversion efficiency, a control method in the design of the LED driver is generally applied when the dimming depth is low or deep. When a dimming set point is equal to or less than 1%, such a low and deep dimming depth is difficult to achieve by simply reducing a peak current of an inductor in the power converter. In this way, an operating frequency of the power converter may be reduced to achieve energy reduction. However, such a control method may reduce the operating frequency to audio, especially near 10 kHz, which can result in very large noise and difficulty in meeting the noise test standard.

In one embodiment, a dimming control circuit for an LED driver, can include: (i) an adjusting circuit configured to generate an adjusting signal in accordance with a pulse-width modulation (PWM) dimming signal; and (ii) where a switching state of a power transistor of the LED driver is adjusted in accordance with the adjusting signal and a constant current control signal. In one embodiment, a dimming control method for an LED driver, can include: (i) determining a first threshold in accordance with a frequency of the PWM dimming signal and a frequency range of audio noise; (ii) generating an adjusting signal having a first duty cycle when a duty cycle of a PWM dimming signal is not greater than the first threshold; and (iii) controlling, by the adjusting signal, a switching state of a power transistor in the LED driver, where the first duty cycle is greater than the duty cycle of the PWM dimming signal.

Figure 1:
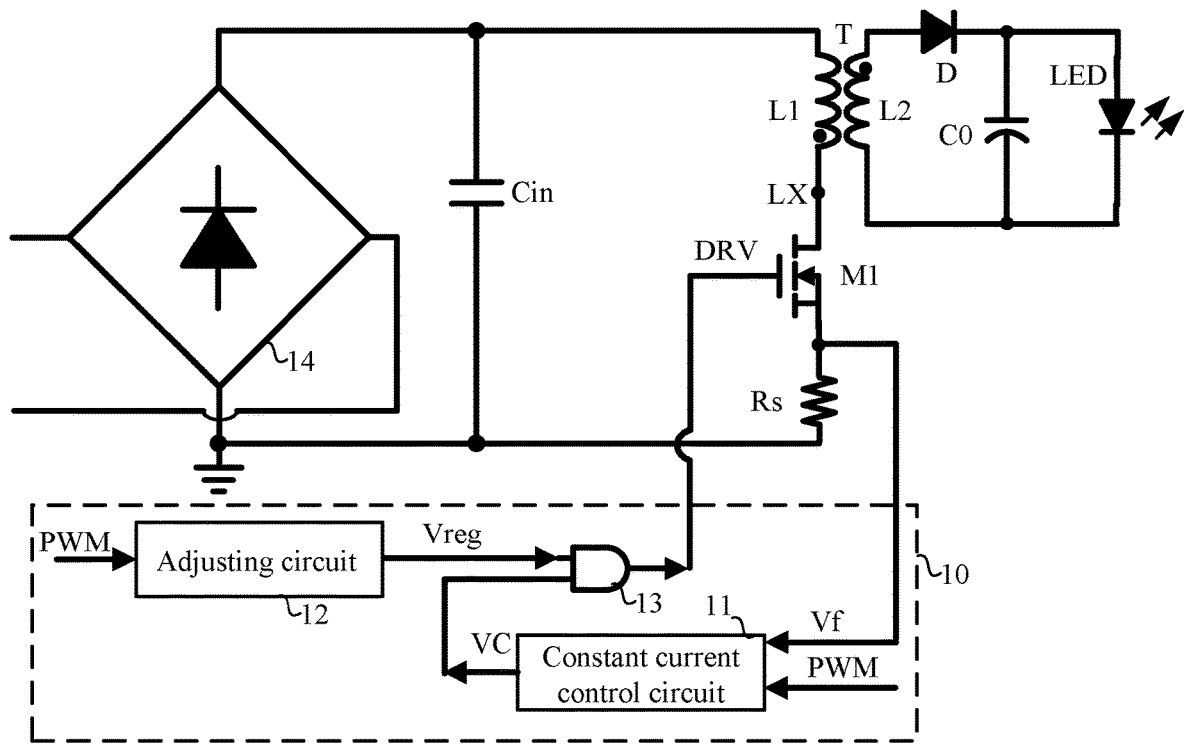
FIG. 1 is a schematic block diagram of an example LED driver, in accordance with embodiments of the present invention.

Referring now to FIG. 1, shown is a schematic block diagram of an example LED driver, in accordance with embodiments of the present invention. This particular example LED driver can generate a drive current for driving an LED load in accordance with a PWM dimming signal. This LED driver can include dimming control circuit 10, rectified circuit 14, a power stage circuit, and the LED load. In this example, the power stage circuit is a flyback topology. Rectified circuit 14 can receive an alternating current (AC) input voltage, and may convert it to a direct current (DC) input voltage of the flyback converter.

In the flyback converter, one terminal of primary winding L1 can connect to an input terminal of the power stage circuit. Power transistor M1 can connect between the other terminal of primary winding L1 and ground terminal GND of dimming control circuit 10. In this example, power transistor M1 may be a controlled semiconductor switching device, such as a metal-oxide semiconductor field effect transistor (MOSFET) or a bipolar junction transistor (BJT). Secondary winding L2 is coupled to primary winding L1. Rectified diode D can connect between one terminal of secondary winding L2 and an output terminal of the LED driver. The other terminal of secondary winding L2 can connect to a ground terminal of a secondary side circuit.

Output capacitor Co can connect between the output terminal of the LED driver and the ground terminal of the secondary side circuit. The power stage circuit may also include capacitor Cin for filtering the DC input voltage generated by rectified circuit 14. One terminal of capacitor Cin can connect to the input terminal of the power stage circuit, the other terminal of capacitor Cin can connect to ground terminal GND, and ground terminal GND can be used as the ground terminal of a primary side circuit. It should be understood that other topologies of power stage circuits, such as boost topology or buck topology, may also be applied in certain embodiments.

Dimming control circuit 10 can generate control signal DRV of power transistor M1 according to the PWM dimming signal. For example, dimming control circuit 10 can include constant current control circuit 11, adjusting circuit 12, and logic circuit 13. Constant current control circuit 11 can generate constant current control signal VC based on PWM dimming signal PWM and feedback signal Vf. It should be understood that constant current control methods with various control modes can be applied in this example as long as the operating frequency of constant current control circuit 11 is correlated to PWM dimming signal PWM. In some applications, when a duty cycle of PWM dimming signal PWM is deceased, the operating frequency of constant current control circuit 11 can be adaptively deceased. Adjusting circuit 12 can generate adjusting signal Vreg having a "first" duty cycle when the duty cycle of PWM dimming signal PWM is greater than threshold D1, in order to control a switching state of power transistor M1 in the LED driver.

The first duty cycle of adjusting signal Vreg may be greater than the duty cycle of PWM dimming signal PWM. Also, threshold D1 can be determined according to a frequency of PWM dimming signal PWM and a range frequency of the audio noise. When the duty cycle of PWM dimming signal PWM is greater than threshold D1, the first duty cycle of adjusting signal Vreg can be 100%, and the value of the first duty cycle may be adjusted based on the duty cycle of PWM dimming signal PWM. Logic circuit 13 can generate control signal DRV based on adjusting signal Vreg and constant current control signal VC. In addition, the first duty cycle of adjusting signal Vreg may be positively correlated with the duty cycle of the PWM dimming signal.

Figure 2:
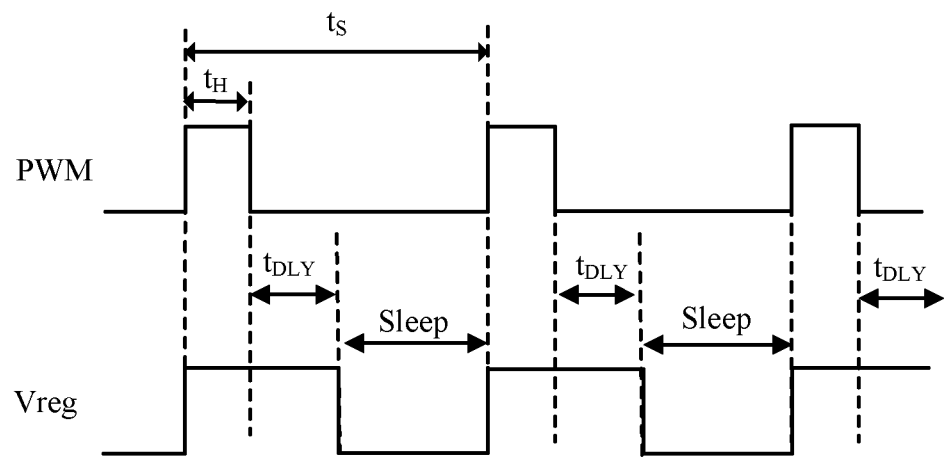
FIG. 2 is a waveform diagram of example operation of the example LED driver, in accordance with embodiments of the present invention.

Referring now to FIG. 2, shown is a waveform diagram of example operation of the example LED driver, in accordance with embodiments of the present invention. In this particular example, during a high level of the PWM signal, adjusting signal Vreg can be set high. When the PWM signal switches to a low level from the high level, adjusting signal Vreg may be switched to be low after being delayed for delay time $t_{DLY}$. Further, delay time $t_{DLY}$ can be positively correlated with the duty cycle of PWM dimming signal PWM. Since adjusting signal Vreg can be high during the high level of the PWM signal, and delay time $t_{DLY}$ is positively correlated with the duty cycle of PWM dimming signal PWM, the first duty cycle of adjusting signal Vreg can be positively correlated with the duty cycle of PWM dimming signal PWM.

It should be understood that when a sum of duration tH of the high-level of PWM dimming signal PWM and delay time $t_{DLY}$ (e.g., a duration of the high-level of adjustment signal Vreg) is greater than or equal to a cycle of the PWM dimming signal, the dimming control circuit can operate in a normal analog dimming mode. Also, when the sum of duration tH of the high-level of PWM dimming signal PWM and delay time $t_{DLY}$ is less than the cycle of PWM dimming signal PWM, the dimming control circuit can operate in an ON/OFF dimming mode based on adjusting signal Vreg.

Logic circuit 13 can generate control signal DRV of power transistor M1 based on constant current control signal VC and adjusting signal Vreg. When constant current control signal VC and adjusting signal Vreg go high simultaneously, control signal DRV of power transistor M1 can go high. Further, during the high level of adjusting signal Vreg, constant current control signal VC generated by constant current control circuit 11 may be enabled to control the on and off states of power transistor M1. During the low level of adjusting signal Vreg, constant current control signal VC can be disabled, during which power transistor M1 is in the off state. Thus dimming control circuit 10 can control power transistor M1 to operate when the PWM dimming signal is at the high level, and control power transistor M1 not to operate after delay time $t_{DLY}$ when the PWM dimming signal is switched to the low level. In this example, logic circuit 13 can include an AND-gate. However, those skilled in the art will recognize that logic circuit 13 can adopt other forms of logic circuits according to the different active levels of constant current control signal VC and adjusting signal Vreg can also be supported in certain embodiments.

In this particular example, the dimming control circuit can operate in the normal analog dimming mode when the duty cycle of the PWM dimming signal PWM is relatively large. When the duty cycle of the PWM dimming signal is relatively small (e.g., the dimming depth is relatively deep or low), the dimming control circuit can perform in the ON/OFF dimming mode according to adjusting signal Vreg having the first duty cycle. Thus, the operating frequency of constant current control circuit 11 can be adjusted based on the duty cycle of PWM dimming signal PWM. For example, the operating frequency of constant current control circuit 11 may be decreased with the decreased duty cycle of PWM dimming signal PWM. However, since the dimming control circuit operates in the ON/OFF dimming mode, the operating frequency of constant current control circuit 11 in the ON/OFF dimming mode can be higher than the operating frequency in the analog dimming mode. By setting the delay time, the operating frequency of the dimming control circuit may not be decreased to the audio when the dimming depth is deep or low in the deep dimming application, thereby reducing the noise of the system and improving the system efficiency of the LED driver in the deep dimming.

Figure 3:
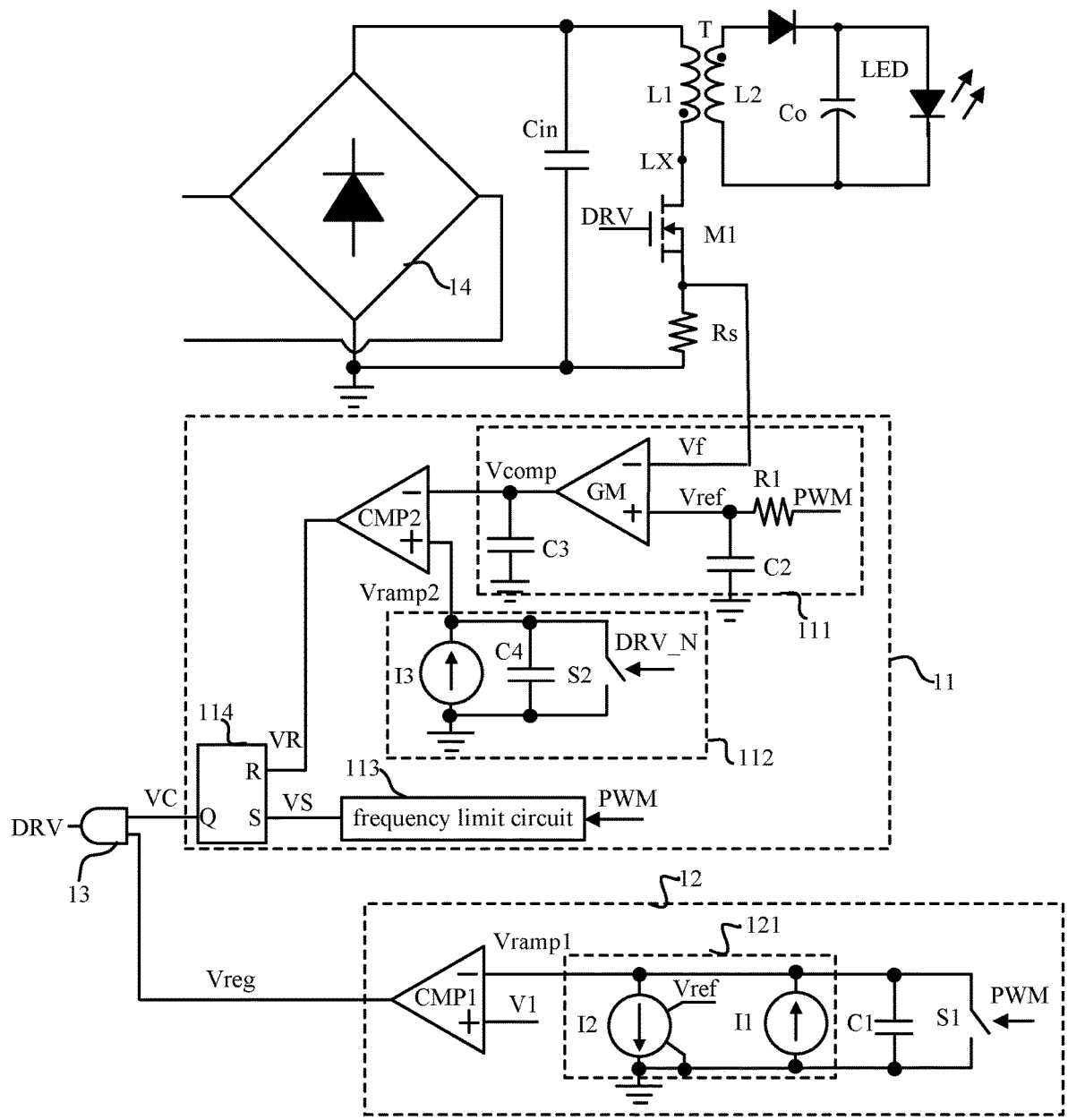
FIG. 3 is a schematic block diagram of another example LED driver, in accordance with embodiments of the present invention.

Referring now to FIG. 3, shown is a schematic block diagram of another example LED driver, in accordance with embodiments of the present invention. This particular constant current control circuit 11 can include error compensation circuit 111, fixed time generation circuit 112, a reset signal generation circuit including comparator CMP2, and a set signal generation circuit including frequency limit circuit 113. For example, error compensation circuit 111 can include a filter circuit including resistor R1 and capacitor C2, and a compensation circuit including transconductance amplifier GM and capacitor C3. The filter circuit can filter the PWM dimming signal PWM to generate a filtered voltage, and the filtered voltage can be used as reference signal Vref. A non-inverting input terminal of transconductance amplifier GM can receive reference signal Vref, and an inverting input terminal of transconductance amplifier GM can receive feedback signal Vf characterizing a load current. An output terminal of transconductance amplifier GM can generate an error signal, and the error signal can be compensated by capacitor C3, in order to generate error compensation signal Vcomp.

Fixed time generation circuit 112 can include current source I3, capacitor C4, and switch S2 connected in parallel. Further, switch S2 can be controlled to be turned on and off by the inverted signal of control signal DRV of power transistor M1. That is, switch S2 may be turned off when power transistor M1 is turned on, and turned on when power transistor M1 is turned off. When switch S2 is turned off, current source I3 can charge capacitor C4, such that ramp signal Vramp2 generated by fixed time generation circuit 112 can increase in a predetermined slope. The duration that ramp signal Vramp2 increases to a predetermined voltage may be fixed and representative of a fixed on-time of power transistor M1. When switch S2 is turned on, capacitor C4 can be discharged, and ramp signal Vramp2 may be decreased to zero.

An inverting input terminal of comparator CMP2 can receive error compensation signal Vcomp, and a non-inverting input terminal of second comparator CMP2 can receive ramp signal Vramp2. When ramp signal Vramp2 increases to the level of error compensation signal Vcomp, comparator CMP2 can generate active reset signal VR, in order to turn off power transistor M1. In this example, frequency limit circuit 113 can receive PWM dimming signal PWM, and may generate a frequency limit signal as set signal VS based on the duty cycle of PWM dimming signal PWM, in order to turn on power transistor M1. Thus, set signal VS can control the operating frequency of power transistor M1.

When the duty cycle of PWM dimming signal PWM is relatively small (e.g., when the dimming depth is deep or low), the operating frequency of constant current control circuit 11 may be adaptively decreased with the decreased duty cycle of PWM dimming signal PWM. RS flip-flop 114 can receive reset signal VR and set signal VS, in order to generate constant current control signal VC. Logic circuit 13 can accordingly generate control signal DRV of power transistor M1 in accordance with constant current control signal VC.

For example, adjusting circuit 12 can include current source circuit 121, switch S1, capacitor C1, and comparator CMP1. An output current of current source circuit 121 may be negatively correlated with the duty cycle of the PWM dimming signal. That is, if the duty cycle of the PWM dimming signal is relatively large, the output current of current source circuit 121 may be small. Current source circuit 121 can include constant current source I1 whose current direction is a direction for charging capacitor C1, and voltage-controlled current source 12 whose current direction is opposite to that of constant current source I1. Further, voltage-controlled current source 12 can be controlled by reference signal Vref (e.g., the filter voltage).

Since the change trend of reference signal Vref is consistent with the change trend of the duty cycle of PWM dimming signal PWM, a current for charging capacitor C1 generated by current source circuit 121 may be correlated to the duty cycle of PWM dimming signal PWM accordingly, such that ramp signal Vramp1 can be correlated to the duty cycle of PWM dimming signal PWM. Switch S1 controlled by PWM dimming signal PWM can connect in parallel with current source circuit 121. Capacitor C1 can connect in parallel with switch S1, and ramp signal Vramp1 may be generated at two terminals of capacitor C1. Comparator CMP1 can compare ramp signal Vramp1 against reference voltage V1, in order to generate adjusting signal Vreg.

Since switch S1 is turned off when PWM dimming signal PWM is switched to the low level, ramp signal Vramp1 can increase, and the duration that ramp signal Vramp1 increases to reference voltage V1 may be representative of delay time $t_{DLY}$. Thus, adjusting signal Vreg can switch to the low level after delay time $t_{DLY}$ when PWM dimming signal PWM is switched to the low level. Therefore, when the duty cycle of PWM dimming signal PWM is relatively large, the current for charging capacitor C1 may be relatively small. Thus, ramp signal Vramp1 can increase slowly to reference voltage V1, such that the high level duration of adjusting signal Vreg is increased. In this way, delay time $t_{DLY}$ may be determined by the current for charging capacitor C1, and the current for charging capacitor C1 can be controlled by reference signal Vref (e.g., the filtered voltage). It should be understood that, in some applications, if delay time $t_{DLY}$ does not need to change with the duty cycle of PWM dimming signal PWM, the operation of voltage-controlled current source 12 can be disabled.

Figure 4:
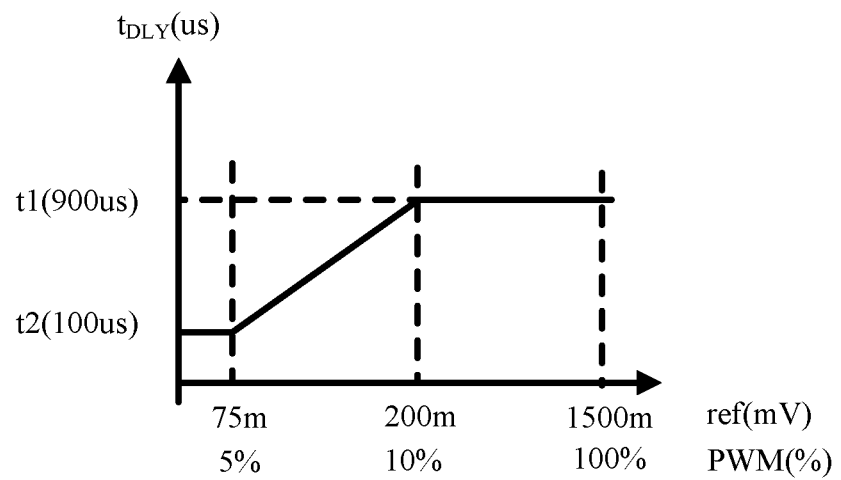
FIG. 4 is a waveform diagram of a first example relationship curve between a duty cycle and delay time, in accordance with embodiments of the present invention.

Referring now to FIG. 4, shown is a waveform diagram of a first example relationship curve between a duty cycle and delay time, in accordance with embodiments of the present invention. In a first range, e.g., when the duty cycle of PWM dimming signal PWM is between 0% and 5%, delay time $t_{DLY}$ may be set to fixed time t2=100 us. In a second range, e.g., when the duty cycle of PWM dimming signal PWM is between 5% and 10%, delay time $t_{DLY}$ may be set to increase linearly with the duty cycle of PWM dimming signal PWM. In a third range, e.g., when the duty cycle of PWM dimming signal PWM is between 10%-100%, delay time $t_{DLY}$ may be set to fixed time t1=900 us.

Taking cycle ts of PWM dimming signal PWM as 1000 us as an example, when the duty cycle of PWM dimming signal PWM is 5%, high level duration $t_H$ of PWM dimming signal PWM is 5%*1000 us(50 us), and delay time $t_{DLY}$=100 us, such that power transistor M1 can be controlled to operate for 150 us. When the duty cycle of PWM dimming signal PWM is 10%, high level duration $t_H$ of PWM dimming signal PWM is 100 us, and delay time $t_{DLY}$=900 us, such that power transistor M1 can be controlled to operate for 1000 us. When the duty cycle of PWM dimming signal PWM is greater than 10%, the sum of high level duration $t_H$ of PWM dimming signal PWM and delay time $t_{DLY}$ can be greater than cycle ts, such that power transistor M1 can always operate based on the constant current control signal.

Taking cycle ts of PWM dimming signal PWM is 2000 us as an example, when the duty cycle of PWM dimming signal PWM is 5%, the sum of high level duration $t_H$ of PWM dimming signal PWM and delay time $t_{DLY}$ can be expressed as follows: $t_H+t_{DLY}$=200 us. That is, the high-level duration of adjusting signal Vreg is 200 us, such that power transistor M1 can operate for 200 us. When the duty cycle of PWM dimming signal PWM is 10%, the sum of high level duration $t_H$ of PWM dimming signal PWM and delay time $t_{DLY}$ can be expressed as follows: $t_H+t_{DLY}$=1100 us, power transistor M1 can operate for 1100 us. When the duty cycle of PWM dimming signal PWM is 55%, the sum of high level duration $t_H$ of PWM dimming signal PWM and delay time $t_{DLY}$ can be expressed as follows: $t_H+t_{DLY}$=2000 us, power transistor M1 can operate for 2000 us. When the duty cycle of PWM dimming signal PWM is greater than 55%, power transistor M1 can always operate based on the constant current control signal.

Accordingly, by adjusting the length of delay time $t_{DLY}$, the duty cycle of PWM dimming signal PWM can be changed when the dimming control circuit enters the ON/OFF dimming mode; that is, threshold D1 can be changed. At different frequencies of PWM dimming signal PWM, the duty cycle of PWM dimming signal PWM may also be different when the dimming control circuit enters the ON/OFF dimming mode, which can be convenient for the user to adjust threshold D1 in certain applications.

For example, if the operating frequency of constant current control circuit 11 can decrease to 10 kHz when the duty cycle of PWM dimming signal PWM is 20%, the time of entering the ON/OFF dimming mode for constant current control circuit 11 can be adjusted to a time that the duty cycle of PWM dimming signal PWM is 30% by adjusting delay time $t_{DLY}$. Thus, constant current control circuit 11 can operate in the ON/OFF dimming mode based on the adjusting signal, thereby increasing the operating frequency of constant current control circuit 11 at deep dimming depth, and reducing noise.

Figure 5:
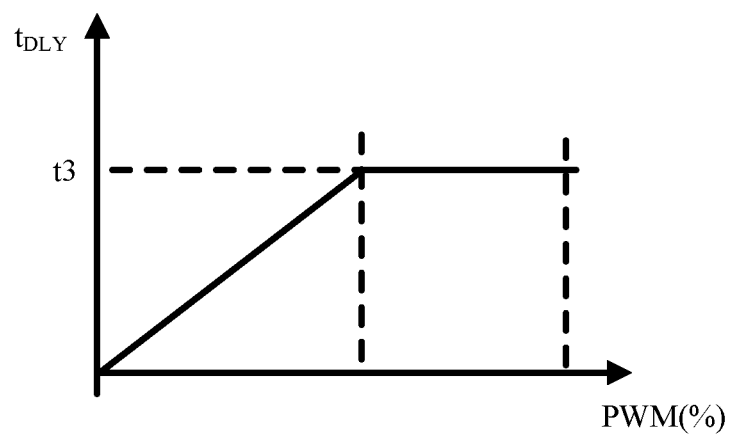
FIG. 5 a waveform of a second example relationship curve between a duty cycle and delay time, in accordance with embodiments of the present invention.
Figure 6:
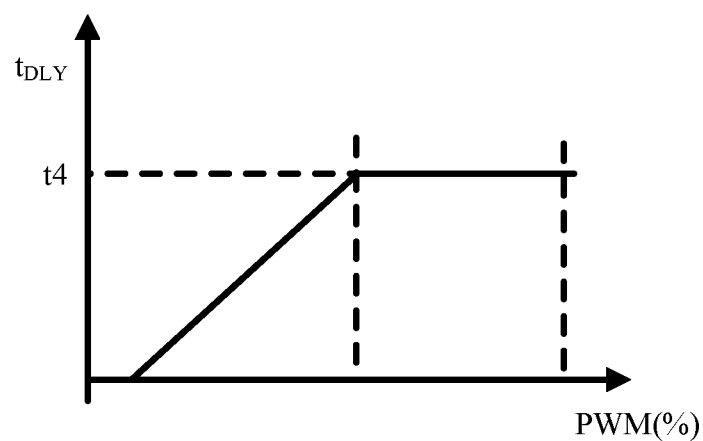
FIG. 6 a waveform of a third example relationship curve between a duty cycle and delay time, in accordance with embodiments of the present invention.

It can be understood that the corresponding relationship between the duty cycle and the delay time can be other forms. FIGS. 4 and 6 show the other two relationships between the duty cycle and the delay time. The range of the duty cycle of PWM dimming signal PWM may be set to two segments as shown in FIG. 5. In the first range, delay time $t_{DLY}$ can be set to increase linearly with the duty cycle of PWM dimming signal PWM. In the second range, delay time $t_{DLY}$ may be set to fixed time t3. As shown in FIG. 6, delay time $t_{DLY}$ in the first range may be set to 0 us. In the second range, delay time $t_{DLY}$ can be set to increase linearly with the duty cycle of PWM dimming signal PWM. In the second range, delay time $t_{DLY}$ may be set to fixed time t4.

Particular embodiments may also provide a dimming control method that can include determining a first threshold according to a frequency of the PWM dimming signal and a frequency range of audio noise. When the duty cycle of the PWM dimming signal is not greater than the first threshold, an adjusting signal having a first duty cycle can be generated to control a switching state of a power transistor in the LED driver, and the first duty cycle of the adjusting signal is greater than the duty cycle of the PWM dimming signal.

For example, the control method can also include generating a constant current control signal according to the PWM dimming signal and a feedback signal, in order to generate a control signal of the power transistor in the LED driver according to the constant current control signal and the adjusting signal. In addition, when the duty cycle of the PWM dimming signal is greater than the first threshold, the duty cycle of the adjusting signal can be 100%, and the first duty cycle can be adjusted according to the duty cycle of the PWM dimming signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A dimming control circuit for a light-emitting diode (LED) driver, the dimming control circuit comprising:
   a) an adjusting circuit configured to generate an adjusting signal in accordance with a pulse-width modulation (PWM) dimming signal, wherein said adjusting signal is active when said PWM dimming signal is active, and said adjusting signal switches to be inactive after being delayed for a delay time that is positively correlated with a duty cycle of said PWM dimming signal;
   b) wherein a switching state of a power transistor of said LED driver is adjusted in accordance with said adjusting signal and a constant current control signal; and
   c) wherein a first duty cycle of said adjusting signal is adjusted in accordance with said duty cycle of said PWM dimming signal that is representative of a dimming depth, and a frequency of said adjusting signal equals a frequency of said PWM dimming signal.

2. The dimming control circuit of claim 1, further comprising a constant current control circuit configured to generate said constant current control signal based on said PWM dimming signal and a feedback signal representing a load current of said LED driver.

3. The dimming control circuit of claim 2, further comprising a logic circuit configured to generate a control signal of said power transistor in said LED driver in accordance with said adjusting signal and said constant current control signal.

4. The dimming control circuit of claim 2, wherein an operating frequency of said constant current control circuit is correlated with said PWM dimming signal.

5. The dimming control circuit of claim 1, wherein:
   a) said power transistor is controlled by said constant current control signal when said adjusting signal is active; and
   b) said power transistor is disabled when said adjusting signal is inactive.

6. The dimming control circuit of claim 5, wherein said adjusting signal is configured to be inactive after a delay time when said PWM dimming signal is inactive.

7. The dimming control circuit of claim 6, wherein said delay time is positively correlated with said duty cycle of said PWM dimming signal.

8. The dimming control circuit of claim 1, wherein said first duty cycle is 100% when said first duty cycle is greater than a first threshold.

9. The dimming control circuit of claim 8, wherein said first duty cycle is configured to be varied with said duty cycle of said PWM dimming signal when said first duty cycle is not greater than said first threshold.

10. The dimming control circuit of claim 8, wherein said first threshold is adjusted by adjusting a delay time.

11. The dimming control circuit of claim 1, wherein said adjusting circuit comprises:
    a) a current source circuit having a current that is negatively correlated with said duty cycle of said PWM dimming signal;
    b) a first switch coupled to said current source circuit, and being controlled by said PWM dimming signal; and
    c) a first capacitor coupled in parallel with said first switch, and being configured to generate said first ramp signal at two terminals of said first capacitor.

12. The dimming control circuit of claim 11, wherein said current source circuit comprises:
    a) a constant current source; and
    b) a voltage-controlled current source having a current direction that is opposite to that of said constant current source and is controlled by a filtered voltage generated by filtering said PWM dimming signal.

13. An LED driver, comprising the dimming control circuit of claim 1, and further comprising:
    a) a rectified circuit configured to receive an alternating current (AC) input voltage, and to generate to a direct current (DC) input voltage; and
    b) a power stage circuit configured to receive said DC input voltage, and to generate a load current for driving an LED load.

14. The dimming control circuit of claim 1, wherein said adjusting circuit comprises a first switch coupled to said current source circuit, and being controlled by said PWM dimming signal.

15. The dimming control circuit of claim 1, wherein said adjusting circuit comprises a first comparator configured to compare a first ramp signal against a reference voltage to generate said adjusting signal.

* * * * *